May 7, 1929.  H. FRISCHER  1,711,638

APPARATUS FOR TREATING SOLUTIONS

Filed Nov. 30, 1927

Inventor:
Hermann Frischer
by
Atty.

Patented May 7, 1929.

1,711,638

UNITED STATES PATENT OFFICE.

HERMANN FRISCHER, OF COLOGNE-LINDENTHAL, GERMANY.

APPARATUS FOR TREATING SOLUTIONS.

Application filed November 30, 1927, Serial No. 236,706, and in Germany December 6, 1926.

My invention refers to apparatus for treating solutions. It is an object of my invention to provide a combined dissolving filtering and washing apparatus.

The apparatus hitherto in use do not permit satisfactorily dissolving, filtering and washing in a single vessel soluble bodies such as salts and the like intermingled with insoluble substances.

I have found that these three operations can easily be carried out in a single vessel, which may be a horizontally or vertically arranged cylindrical vessel, in which is mounted a stirring device with a sieve drum or drums forming filters and having arranged on their circumference stirring blades of a suitable shape. If the material to be dissolved is introduced into the drum which contains the solvent, rotation of the drum will cause dissolution of the material and the solution thus formed will gradually pass across the walls of the drum, leaving behind the insoluble constituents and being returned into the drum by the stirring blades which force the solution across the upper parts of the drum walls. In this manner the solution can be made to circulate repeatedly between the sieve drum and the outer vessel and, after it has been tapped off, the residue in the drum can be washed with water or the like or with fresh solvent. If desired, a plurality of concentric sieve drums may be provided, which permit filtering in stages.

In the drawings affixed to this specification and forming part thereof an apparatus embodying my invention is illustrated diagrammatically by way of example.

Figure 1:
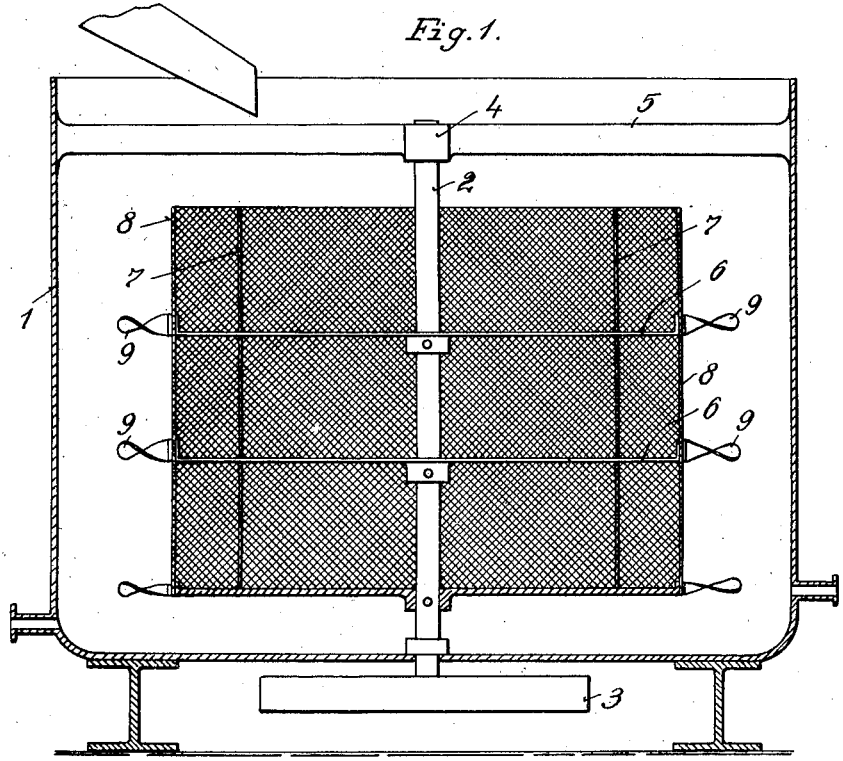
Fig. 1 is a vertical axial section.

Referring first to Fig. 1, 1 is the vessel or tank proper and 2 is a vertical shaft extending axially of the tank and across its bottom, 3 being a pulley mounted on the free end of the shaft, the upper end of which is supported in a bearing 4 forming part of the cross beam 5. 6, 6 are stirrer arms mounted on the shaft and 7, 8 are concentric sieve drums secured on the shaft and traversed by the arms 6. The outer ends of these arms project from the perforated wall of the outer drum 8 and are formed into helically bent blades 9 adapted, when rotating in one direction, to impart to the liquid, in which they are traveling a movement in upwards and inwards direction. Means are provided at 10 for heating the liquid in the drums.

Figure 2:
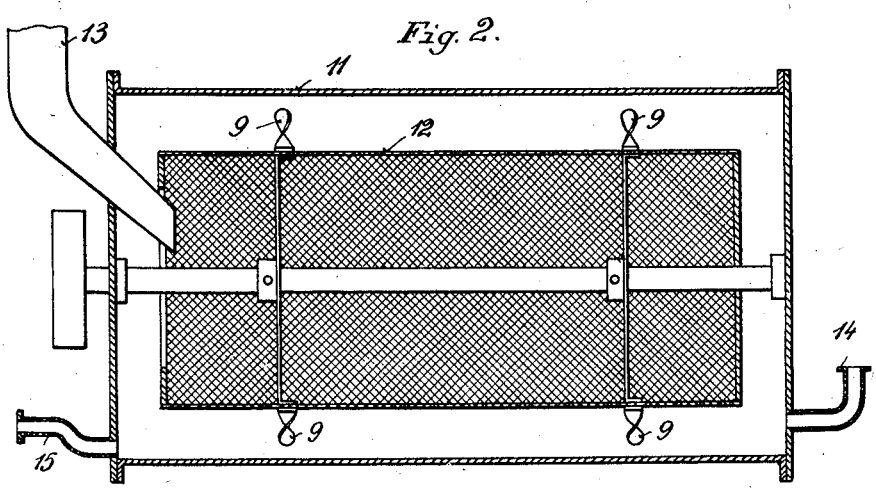
Fig. 2 is a similar view of a modification.

Fig. 2 illustrates a horizontally arranged tank 11 with a sieve drum 12. The substance to be dissolved is fed in at 13, the solvent at 14. I am thus enabled to treat the material in a continuous manner, the substance to be treated being washed and dissolved on its way from the entrance end to the exhaust end, the concentrated liquor being withdrawn at 15. Here also dissolution can be expedited by heating with steam either directly or indirectly, and a plurality of sieve drums may be provided. The sieves may be cylindrical or conical, tapering either towards the entrance or the exhaust end.

The material to be chosen for the tanks and the sieve drums will have to be chosen according to the substances to be treated. I may use sieves of perforated metal or wire mesh, suitable filtering material being placed around the drums, or sieve drums consisting of porous ceramic materials or the like may be used.

I wish it to be understood that I do not desire to be limited to the exact details of construction shown and described for obvious modifications will occur to a person skilled in the art.

I claim:—

1. A combined dissolving, filtering and washing apparatus comprising a vessel, a rotary stirrer in said vessel, a sieve or filter drum combined with said stirrer to form a rotary unit and stirring blades on the outer wall of said drum.

2. A combined dissolving, filtering and washing apparatus comprising a vessel, a rotary stirrer in said vessel, a sieve or filter drum combined with said stirrer to form a rotary unit and stirring blades on the outer wall of said drum, said blades being arranged to force liquid in upwards and inwards direction.

In testimony whereof I affix my signature.

HERMANN FRISCHER.